United States Patent
Desai et al.

(10) Patent No.: US 7,498,858 B2
(45) Date of Patent: Mar. 3, 2009

(54) INTERPOLATOR SYSTEMS WITH LINEARITY ADJUSTMENTS AND RELATED METHODS

(75) Inventors: Jayen J. Desai, Wellington, CO (US); Bruce Doyle, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/978,328

(22) Filed: Nov. 1, 2004

(65) Prior Publication Data

US 2006/0091925 A1    May 4, 2006

(51) Int. Cl.
*H03H 11/16*    (2006.01)
(52) U.S. Cl. ............... 327/246; 327/247; 327/274; 327/280; 330/258
(58) Field of Classification Search ........... 327/246, 327/247, 274, 280; 330/258
See application file for complete search history.

(56) References Cited

U.S. PATENT DOCUMENTS

| | | | | |
|---|---|---|---|---|
| 5,536,934 A * | 7/1996 | Hayashi | ............ | 250/214.1 |
| 5,589,792 A * | 12/1996 | Brokaw | ............ | 327/512 |
| 5,847,616 A * | 12/1998 | Ng et al. | ............ | 331/57 |
| 5,939,904 A * | 8/1999 | Fetterman et al. | ............ | 327/67 |
| 5,955,929 A * | 9/1999 | Moon et al. | ............ | 331/57 |
| 6,125,157 A * | 9/2000 | Donnelly et al. | ............ | 375/371 |
| 6,359,486 B1 * | 3/2002 | Chen | ............ | 327/231 |
| 6,384,653 B1 * | 5/2002 | Broome | ............ | 327/247 |
| 6,414,557 B1 * | 7/2002 | Liu | ............ | 331/57 |
| 6,580,326 B2 * | 6/2003 | Bach et al. | ............ | 330/277 |
| 6,597,212 B1 * | 7/2003 | Wang et al. | ............ | 327/117 |
| 6,642,767 B2 * | 11/2003 | Wang | ............ | 327/307 |
| 6,677,822 B2 * | 1/2004 | Hasegawa | ............ | 330/258 |
| 6,717,478 B1 * | 4/2004 | Kim et al. | ............ | 331/57 |
| 6,756,924 B2 * | 6/2004 | Lee et al. | ............ | 341/120 |
| 6,888,389 B2 * | 5/2005 | Baba | ............ | 327/261 |
| 6,943,606 B2 * | 9/2005 | Dunning et al. | ............ | 327/231 |
| 6,954,110 B2 * | 10/2005 | Li | ............ | 331/57 |

OTHER PUBLICATIONS

Thomas H. Lee, Kevin S. Donnelly, John T. C. Ho, Jared Zerbe, Mark G. Johnson, Toru Ishikawa, A 2.5 V CMOS Delay-Locked Loop for an 18 Mbit, 500 Megabyte/s DRAM, IEEE Journal of Solid-State Circuits, Dec. 1994, pp. 1491-1496, vol. 29, No. 12, IEEE.

Thomas H. Lee, John F. Bulzacchelli, A 155-Mhz Clock Recovery Delay- and Phase-Locked Loop, IEEE Journal of Solid-State Circuits, Dec. 1992, pp. 1736-1746, vol. 27, No. 12, IEEE.

(Continued)

*Primary Examiner*—Kenneth B. Wells (57) ABSTRACT

Embodiments of an interpolator system and method are disclosed. One embodiment of an interpolator system, among others, includes an interpolator having first and second output terminals providing output signals; a comparator coupled to the first and second output terminals and configured to detect a peak voltage level of the output signals and compare the peak voltage level with a reference voltage level; and an impedance element coupled to the comparator and the first and second output terminals, wherein the comparator is configured to provide a control signal to the impedance element to change the impedance of the impedance element to set a voltage variation of the output signals.

14 Claims, 5 Drawing Sheets

OTHER PUBLICATIONS

Ramin Fariad-Rad, William Dally, Hiok-Tiaq, Ramesh Senthinathan, M.-J. Edward Lee, Rohit Tathi, John Poulton, A Low-Power Multiplying DLL for Low-Jitter Multigigahertz Clock Generation in Highly Integrated Digital Chips, IEEE Journal of Solid-State Circuits, Dec. 2002, pp. 1804-1812, vol. 37, No. 12, IEEE.

Ken Chang, Sudhakar Pamartl, Kambiz Kaviani, Elad Alon, Xudong Shi, Tj Chin, Jie Shen, Gary Yip, Chris Madden, Raif Schmitt, Chuck Yuan, Fari Assaderaghi, Mark Horowitz, Clocking and Circuit Design for a Parallel I/O on a First-Generation CELL Processor, IEEE International Solid-State Circuits Conference, 2005, pp. 526-615, ISSCC 2005, Session 28, Clocking and I/O, 28.9, IEEE.

HyperTransport I/O Link Specification, Technical Document, Apr. 21, 2006, p. 420, 30.2, HyperTransport Technology Consortium.

* cited by examiner

INTERPOLATOR SYSTEMS WITH LINEARITY ADJUSTMENTS AND RELATED METHODS

BACKGROUND

An interpolator includes a category of circuits or systems that are typically used to adjust the phase of sampling clock signals in fine increments. An interpolator may be used in a receiver in a serial link, such as in a data recovery system, to adjust the phase of clock signals to enable alignment with data bit pulses included in an incoming asynchronous data stream. Another implementation may be for use in a microprocessor that receives input clock signals that have a frequency that differs from its core clock frequency. An interpolator in these implementations may be used to align the various clock signals to the core clock to provide for proper timing. An interpolator may be implemented according to several configurations, such as a current-controlled interpolator or voltage-controlled interpolator.

Figure 1:
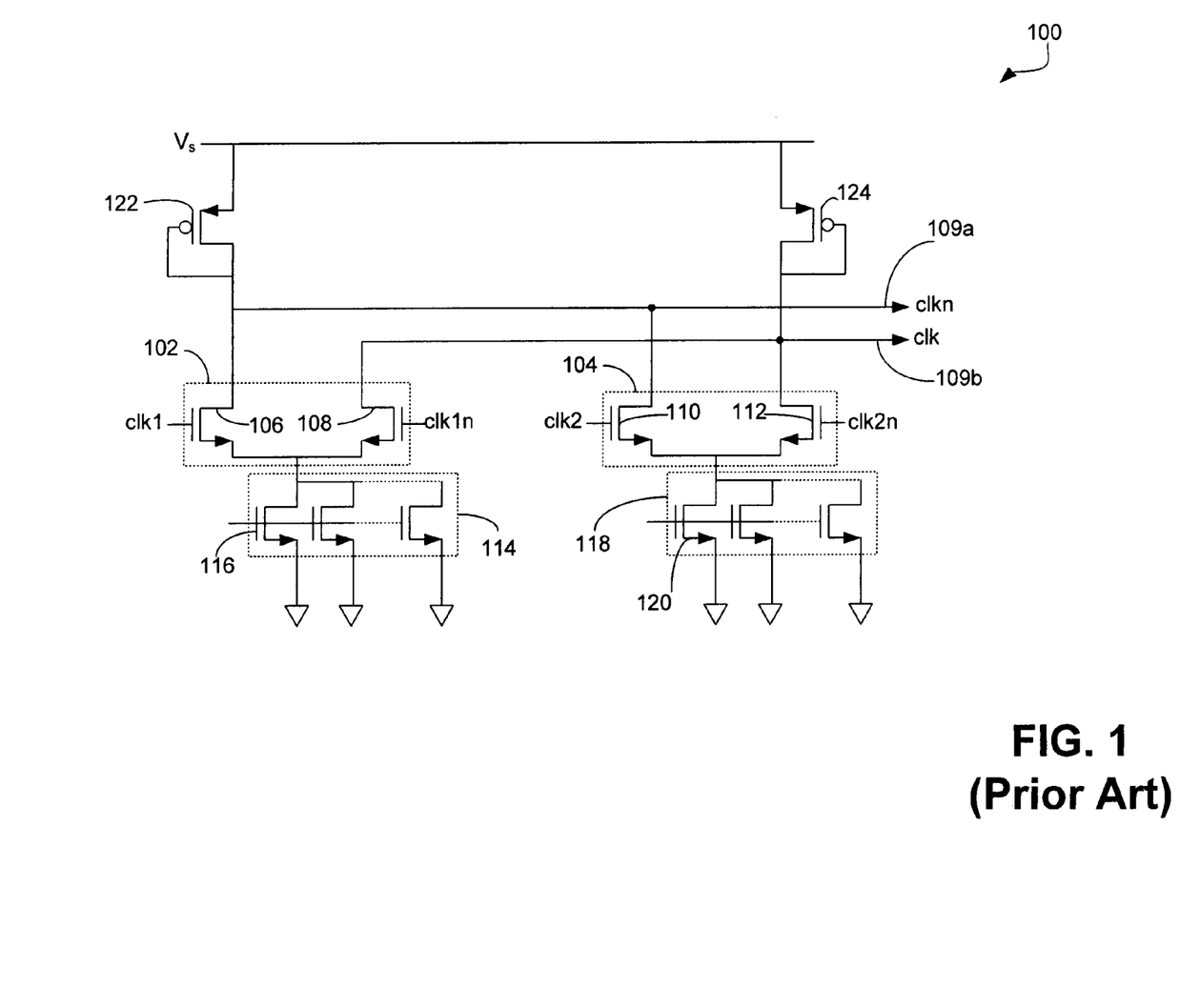
FIG. 1 is a schematic diagram of an example interpolator.

FIG. 1 is a schematic diagram of an example interpolator 100. The interpolator 100 includes a differential amplifier 102 that receives a first clock input signal, clk1 (and its inverse or complement signal, clk1n), and a differential amplifier 104 that receives a second clock input signal, clk2 (and its inverse or complement. signal, clk2n). The differential amplifiers 102 and 104 are coupled in a wired-OR configuration. The differential amplifier 102 includes transistors 106 and 108. Although shown using n-channel, metal-oxide semiconductor (NMOS) transistors, other transistor types and configurations may be used. Transistor 106 is coupled to a current source 122, the latter configured in one example as a diode-connected, p-channel, MOS (PMOS) transistor. The current source 122 is supplied by a voltage source, $V_s$. The drain terminal of transistor 106 is coupled to output terminal 109a, on which a complementary clock signal clkn is provided. The drain terminal of transistor 108 is coupled to output terminal 109b, on which a clock signal elk is provided. The differential amplifier 102 is also coupled to a current sink 114. The current sink 114 may be comprised of a plurality of parallel-configured transistors (e.g., NMOS) 116. At any given time the total number of transistors 116 that are activated may vary from zero to a total of N transistors 116.

The differential amplifier 104 is configured similarly to the differential amplifier 102, and includes transistors 110 and 112. The transistor 112 is coupled to a current source 124, which is coupled to a voltage supply, $V_s$. The drain terminals of transistors 110 and 112 are coupled to output terminals 109a and 109b, respectively. The differential amplifier 104 is also coupled to current sink 118, which includes a plurality of parallel-configured transistors 120, similar to current sink 114.

In operation, the interpolator 100 receives clock signals from a clock source and shifts the clock signal phases in finite increments by adjusting the quantity of transistors 116 and 120 that are activated. For example, assuming input clock signals clk1 and clk2, clk2 being shifted 90-degrees in phase relative to clk1, the output clock signal clk on output terminal 109b would have a phase shift in the range of 0-90 degrees. The interpolator 100 accomplishes this function through the activation of a select quantity of transistors 116 and 120. For example, if all the transistors 116 of current sink 114 are activated (and transistors 120 are not activated), then the output clock signal elk on output terminal 109b will be equivalent in phase to clk1 (plus some fixed phase delay). If all the transistors 120 are activated (and no transistors 116 are activated), then the output clock signal clk on output terminal 109b will be equivalent in phase to clk2 (plus some fixed phase delay). Any other combination of activated transistors 116 and/or 120 results in an output clock signal clk that has a phase shifted somewhere between clk1 and clk2. Thus, the ability to shift the phase of the output clock signal clk to a phase ranging between that provided by clk1 and clk2 enables the output clock to be aligned with the incoming data.

One or more problems may arise with the interpolator architecture shown in FIG. 1. First, as the number of activated transistors 116 and/or 120 changes between current sinks 114 and 118, the gain of the differential amplifier transistor pairs changes, and hence the output swing varies. Additionally, as the number of activated current sink transistors 116 said/or 120 changes, the impedance to the rails varies. A variation in the impedance causes a shift in the output clock signal common mode. A common mode output refers to the average level round which the output swings. When the output swings, a stage that receives the output has some "trip-point." The stage is then effected by this shift, which can cause an error in the interpolated result. Also, there is a power supply sensitivity corresponding to the operation of the interpolator circuit. In other words, as the power supply varies, so does the output level. Finally, as the number of current sink transistors changes, so does the slew rate and hence the fixed phase delay through the interpolator 100. These three problems, alone or in combination, may cause non-linear operation of the interpolator 100, hence reducing the ability to accurately align the delayed clock to the incoming data stream. For example, non-linearity of the interpolator 100 may lead to compression of the interpolator range and introduce jitter.

Additional problems of conventional interpolator architectures include the fact that such architectures often have a process dependence. That is, each chip that is manufactured possesses different characteristics that are often referred to as process variations. These variations can introduce errors in the interpolator. For example, as a result of some process variations, the transistors of 116 and 118 may not be identical. Thus, the desired weighting performance may not be realized between the two differential amplifiers 102 and 104.

SUMMARY

One embodiment of a method of operating an interpolator system includes receiving a plurality of clock signals; shifting in phase at least one of the plurality of clock signals to provide output clock signals having a defined voltage variation; detecting a peak voltage level of the defined voltage variation; comparing the peak voltage level with a reference voltage level; and responsive to the comparison, providing an adjust signal to an impedance element having an adjustable impedance, the adjust signal changing the impedance to set the defined voltage variation.

One embodiment of an interpolator system includes an interpolator having first and second output terminals providing output signals; a comparator coupled to the first and second output terminals and configured to detect a peak voltage level of the output signals and compare the peak voltage level with a reference voltage level; and an impedance element coupled to the comparator and the first and second output terminals, wherein the comparator is configured to provide a control signal to the impedance element to change the impedance of the impedance element to set a voltage variation of the output signals.

One embodiment of an interpolator system includes means for shifting in phase at least one of a plurality clock signals to provide output clock signals; means for detecting a peak voltage level and comparing the peak voltage level with a reference voltage level; and means for setting a voltage swing of the output clock signals.

One embodiment of a data recovery system includes a first comparator and a second comparator configured to receive data signals; detection logic coupled to the first comparator and the second comparator, the detection logic configured to detect edges corresponding to data transitions in the data signals; and an interpolator system coupled to the first comparator and the second comparator and the detection logic, the interpolator system including: an interpolator having first and second output terminals providing output signals to the first comparator and the second comparator; a third comparator coupled to the first and second output terminals and configured to detect a peak voltage level of the output signals and compare the peak voltage level with a reference voltage level; and an impedance element coupled to the third comparator and the first and second output terminals, wherein the third comparator is configured to provide a control signal to the impedance element to change the impedance of the impedance element to set a voltage variation of the output signals.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of an interpolator system and method, herein referred to as an interpolator system for brevity. An interpolator system is configured to provide for an adjustable output impedance that defines (e.g., sets or limits) the voltage swing of the interpolator system output. With this adjustable output impedance feature, an interpolator system can operate with increased linearity, improving the interpolator range and reducing jitter. Also, the adjustable output impedance feature provides the interpolator system with a decreased sensitivity to power supply variations, and a decreased frequency and process dependence.

Figure 2:
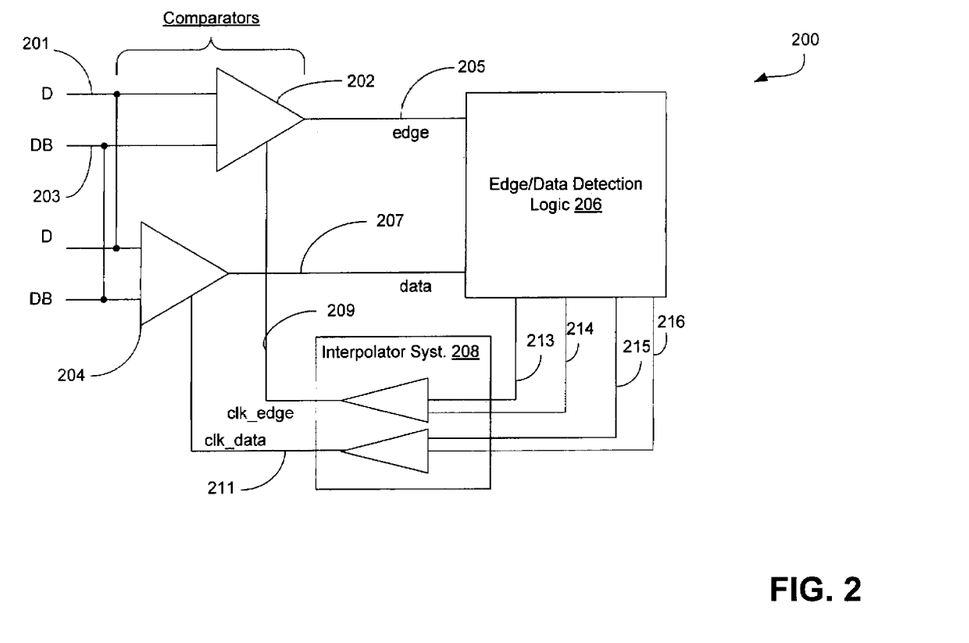
FIG. 2 is a block diagram of an example data recovery system, which illustrates an example implementation for an interpolator system.
Figure 3:
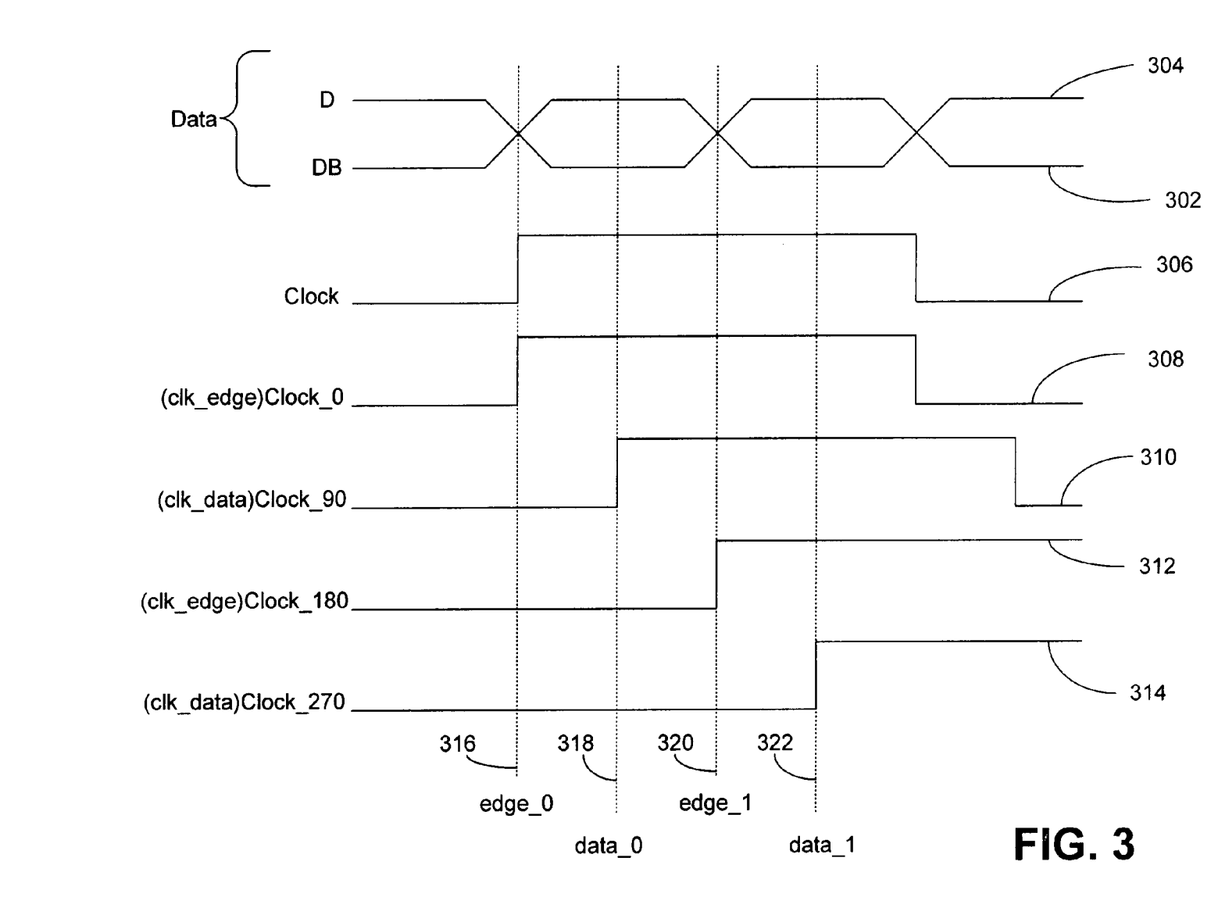
FIG. 3 is a timing diagram corresponding to operation of the data recovery system of FIG. 2.
Figure 4:
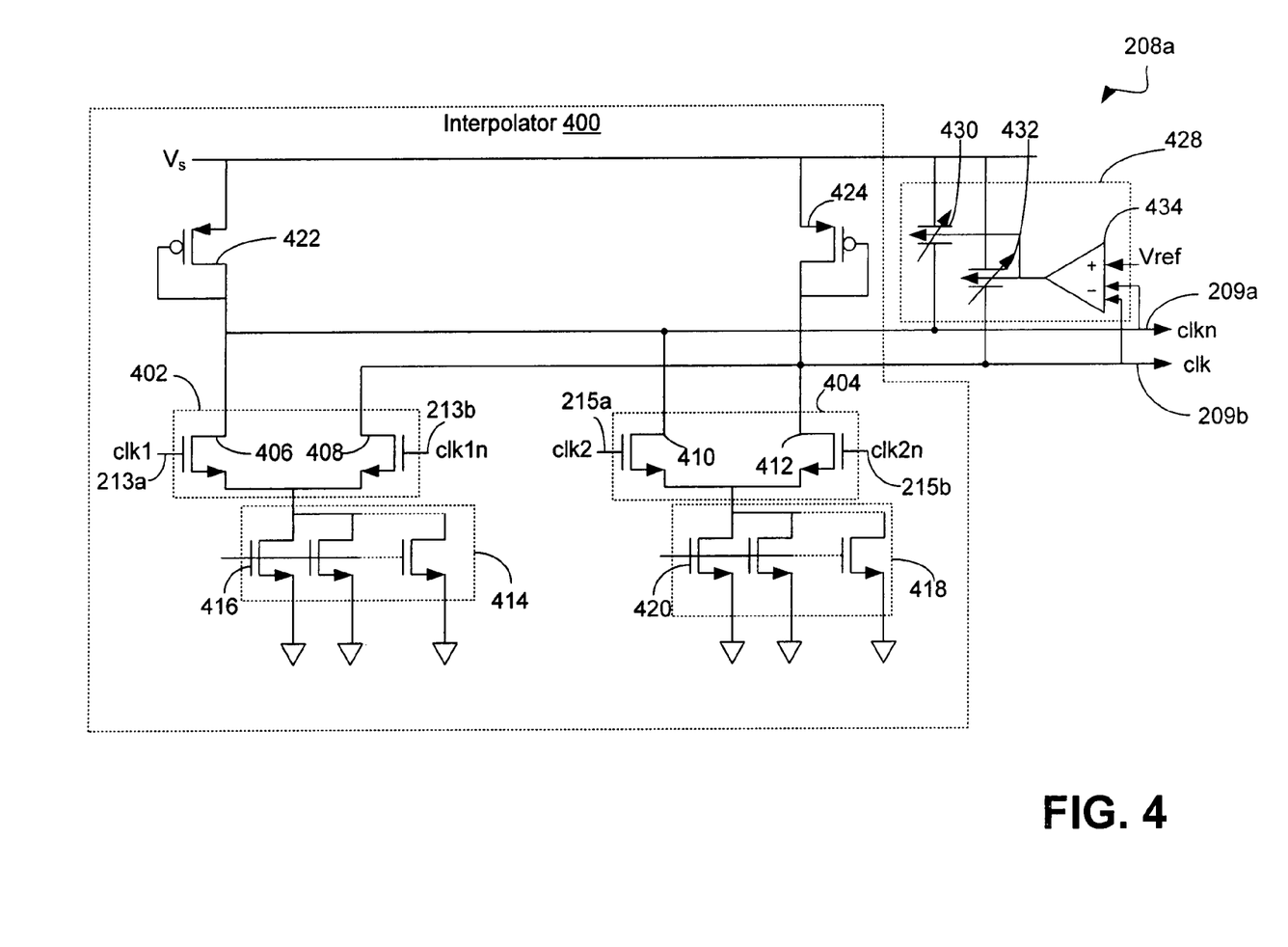
FIG. 4 is a schematic diagram of an embodiment of an interpolator system as shown in FIG. 3.
Figure 5:
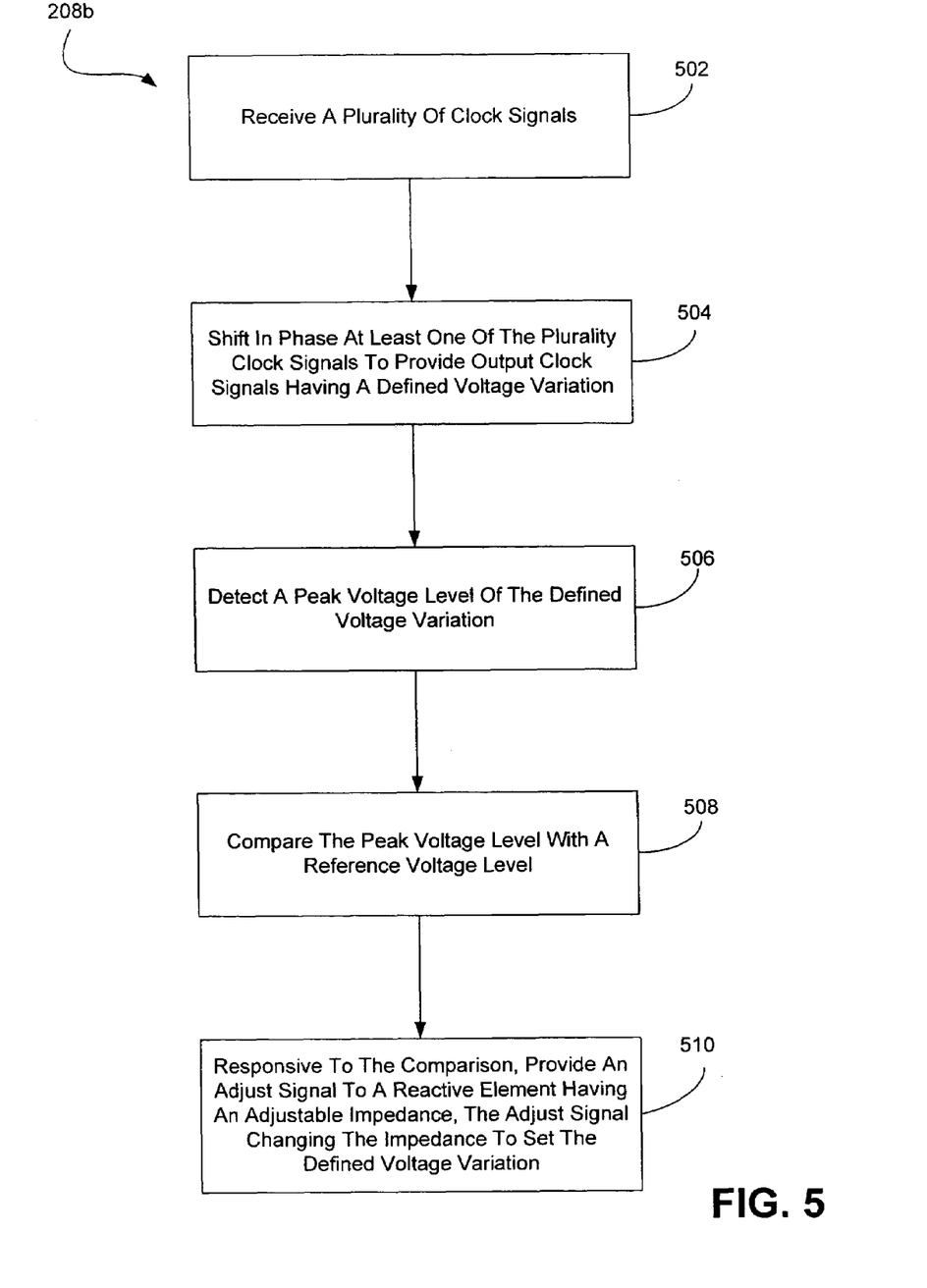
FIG. 5 is a flow diagram that illustrates one embodiment for a method of operation of the interpolator system shown in FIG. 4.

An example implementation for an interpolator system is shown in FIG. 2. The implementation shown in FIG. 2 is described in association with a timing diagram illustrated in FIG. 3. FIG. 4 provides a block diagram illustration of an interpolator system embodiment, and FIG. 5 provides an illustration of one method for operating the interpolator system shown in FIG. 4. Although an interpolator system is described in the context of a data recovery implementation, it will be understood that other implementations are possible. For example, implementations that can benefit from an interpolator system that moves a clock sampling location with improved linearity and/or fine precision are within the scope of this disclosure.

One example implementation for an interpolator system is shown in FIG. 2, which is a block diagram of an embodiment of a data recovery system 200. FIG. 3 is a timing diagram 300 that illustrates the signal timing for the data recovery system 200. The data recovery system 200 may be implemented on a receiver integrated circuit (IC). In general, the data recovery system 200 receives an asynchronous (e.g., no clock reference) data stream that is sent from a transmitting IC (not shown). The data stream may be comprised of a series of data bit pulses that are optimally sampled at the eye of the data pulse (e.g., midway between two edges, or the transition from high to low and vice versa, of the data pulse). To sample the data at an optimum point during a defined period of a data pulse, such as at the midpoint of the data pulse, the data recovery system 200 implements a calibration process whereby a plurality of phase-shifted clock signals are generated and adjusted in time until one of the clock signals is aligned with the data pulse edges (i.e., the transitions between high and low voltage levels of each data pulse in the data stream). The alignment of a clock signal with a data transition enables a data clock signal to be positioned optimally (e.g., midway) between the transition edges, providing a mechanism to optimally sample the data stream upon completing the calibration process.

The data recovery system 200 includes comparators 202 and 204, edge/data detection logic 206, and an interpolator system 208. With reference to FIGS. 2 and 3, the incoming data stream includes a data signal 302, also represented with the letter D, on connection 201. The incoming data stream also includes a data-bar signal 304 (also represented with the letters DB) on connection 203. The data-bar signal 304 is the inverse of (i.e., the complement of) the data signal 302. That is, when D is high, DB is low, and vice versa. Comparators 202 and 204 receive the data signals (D) 302 and (DB) 304. Comparator 202 compares the signal levels of (D) 302 and (DB) 304 and provides a signal on connection 205 when (D) 302 is greater than or less than (DB) 304. The comparator 204 compares the signal levels of (D) 302 and (DB) 304 and provides a signal on connection 207 when (D) 302 is greater than or less than (DB) 304.

As indicated above, operation of the data recovery system 200 can be divided into a calibration stage and a data sampling stage. During the calibration stage, a clock signal (clk_edge on connection 209) is aligned with a data pulse edge or transition included in an incoming data stream. For ease of understanding, single-ended clocking is illustrated. For example, a single clock signal clk_edge from the interpolator system 208 is shown as provided on single connection 209 instead of two signals (clk-edge and its complement) provided on two connections.

The signals on connections 205 (and 207) include a deterministic pattern (e.g., 0101010) that enables the detection of edges in the data stream by the edge/data detection logic 206. The edge/data detection logic 206 may be clocked by an external clock source, for instance by a clock (not shown) providing a clock signal (306) feeding a phase-locked loop (PLL, not shown). A phase-locked loop may be located on the receive IC. The PLL runs at a rate equivalent to the data rate/2, and generates clock signals in defined phase increments, such as phase shifts of 90-degree increments (0°, 90°, 180°, 270°) to enable sampling of the edge transition followed by a sample of the actual data (the latter occurring post-calibration). Data coming from the transmitting IC is often skewed for various reasons such as track delays etc. Further, the transmitted data is asynchronous to the receive clock generated at the receive IC. To synchronize the data, the four-phased clock signals provided by the PLL are shifted in time by the interpolator system 208.

Continuing with regard to the calibration stage, the edge/data detection logic 206 provides clock signals to the interpolator system 208. In particular, the edge/data detection logic 206 provides clock signals 308 and 310, which are of equal polarity and phase-shifted, to the interpolator system 208 via connections 213 and 214. The interpolator system 208 interpolates the two incoming clock signals 308 and 310 (through a weighting process), resulting in a phase-shifted clock signal clk_edge on connection 209. Note that the input clock signals provided over connections 215 and 216 operate under similar principles post-calibration. The clk_edge signal on connection 209 is used by the comparator 202 during the calibration stage to sample the signals arriving on connections 201 and 203. In practice, two signals (clk_edge and its complement) are used to provide at least two locations to detect an edge. Thus, during the calibration stage, the data recovery system 200 is attempting to move the clk_data edge to the correct location (on a data stream data pulse transition or edge).

Once the edge clock signal (e.g., clk_edge)has been determined to be sampling the data edges of the incoming data stream, the calibration process is complete, and the data clock (clk_data) can then be used to sample the data values.

As an example of how the data recovery system 200 operates post-calibration (data sampling stage), assume a clk_edge signal 308 (represented also as clock_0 to represent a 0° phase shift with respect to clock 306) is provided on connection 209 to sample the incoming data stream edge transition at 316. A clk_data signal 310 is provided on connection 211 to sample the data signal data at approximately the center 318 of the data pulse. The clk_data signal 310 is shifted in phase 90° (thus, clock_90) with respect to clk_edge 308. Similarly, a clk_edge signal 312 (clock_180) is provided on connection 209 to sample the edge transition at 320, and a clk_data signal 314 (clock_270) is provided on connection 211 to sample the data at 322, providing four sample points shifted in 90° increments for a clock period, according to one implementation. Note that fewer or greater numbers of sampling points can be taken.

FIG. 4 is a schematic diagram of an embodiment of an interpolator system 208a. Note that contrary to FIGS. 2 and 3, differential clocking (as opposed to single-ended clocking) is illustrated. The interpolator system 208a includes an interpolator 400 and a voltage adjust circuit 428. The interpolator 400 includes a differential amplifier 402 that receives a first clock input, clk1, and a differential amplifier 404 that receives a second clock input, clk2. The differential amplifiers 402 and 404 are coupled in a wired-OR configuration. Differential amplifier 402 includes input terminals 213a and 213b for input clock signals clk1 and its corresponding complement clk1n, respectively. Input terminal 213a may receive clk1, for example clock_0 (213a-1), with reference to FIGS. 2 and 3. Differential amplifier 402 also includes transistors 406 and 408. Although shown as n-channel, metal oxide semiconductor (NMOS) transistors, other transistor types and configurations may be used. Transistor 406 is coupled to a current source 422, configured in one embodiment as a diode-connected, p-channel MOS (PMOS) transistor. The current source 422 is supplied by a voltage source, $V_s$. The drain terminal of transistor 406 is coupled to output terminal 209a, on which complementary clock signal, clkn, is provided. The drain terminal of transistor 408 is coupled to output terminal 209b, on which clock signal, clk, is provided. The differential amplifier 402 is also coupled to a current sink 414. The current sink 414 is comprised of a plurality of transistors (e.g., NMOS) 416 in a parallel-configuration. At any given time the total number of transistors 416 that are activated may vary from zero to a total of N transistors 416.

The differential amplifier 404 is configured with transistors 410 and 412, in similar manner to that shown for differential amplifier 402. The differential amplifier 404 includes input terminals 215a and 215b, which can receive clock signals clk2 and its corresponding complement clk2n, respectively. For example, clk2 may be clock_90 (215a-1) with reference to FIGS. 2 and 3. Transistor 412 is coupled to a current source 424. The current source 424, configured in one example as a diode-connected PMOS transistor, is coupled to a voltage supply, $V_s$. The drain terminal of transistor 410 is coupled to output terminal 209a. The drain terminal of transistor 412 is coupled to output terminal 209b. The differential amplifier 404 is also coupled to current sink 418, which includes a plurality of parallel-configured transistors (e.g., NMOS) 420. At any given time the total number of transistors 420 that are activated may vary from zero to a total of N transistors 420.

In operation, the interpolator system 208a shifts the clock signal phases in finite increments by adjusting the quantity of transistors 416 and 420 of the current sinks 414 and 418, respectively, that are activated. For example, assuming input clock signals clock_0 and clock_90 on input terminals 213a and 215a, respectively, the output clock on output terminal 209b would be a clock signal, clk, having a phase shift in the range of 0-90 degrees. The interpolator system 208a accomplishes this function through the activation of one or more transistors 416 and/or 420 of current sinks 414 and 418, respectively. As described above, combinations of activated transistors 416 and/or 420 results in an output clock clk that is phased somewhere between and including clk1 and clk2. Thus, the ability to shift the output clock signal clk between clk1 and clk2 enables the output clock signal to be aligned with the incoming data, (D) 302 and (DB) 304 (FIG. 2).

The voltage adjust circuit 428 includes an impedance element comprised in one embodiment as two variable capacitance elements, such as variable capacitors 430s and 432. The voltage adjust circuit 428 also includes a peak detect/comparator circuit 434. In some embodiments, the capacitance elements 430 and 432 may be replaced wit resistance elements (e.g., such as variable resistors). The variable capacitor 430 is coupled between the supply voltage $V_s$ and the output terminal 209a. The variable capacitor 432 is coupled between the supply voltage $V_s$ and the output terminal 209b. The variable capacitors 430 and 432 can be used to control the peak-to-peak level of the voltage swing on the output terminals 209a and 209b of the interpolator system 208a, based on the following equation:

$$T = CV/I, \qquad \text{(Eq. 1)}$$

Where T represents the output slew rate in time (e.g., seconds), C equals the equivalent capacitance of variable capacitors 430 and 432, V equals the voltage across the output terminals 209a and 209b, and I equals the current provided by current sources 422 and 424. It is desirable to keep T constant or substantially constant, which can be achieved through the variation of C with respect to I. By changing the capacitive load of the interpolator system output, the voltage swing can be limited to enable linear operation. In addition, the added impedance load helps to prevent one of the clock inputs clk1 from triggering an output clock signal clk/clkn to the exclusion of the other clock input clks2.

The voltage across output terminals 209a and 209b is provided to the inverting input terminals of the peak detect/comparator circuit 434, and compared to a predetermined reference voltage level at the non-inverting input terminal of the peak detect/comparator circuit 434. The reference voltage level is selected to ensure control of the voltage signal, and thus may be below a level where the peak detect/comparator circuit 434 saturates. If the voltage across output terminals 209a and 209b exceeds a defined threshold value (the reference voltage level) or drops below a defined threshold value (the reference voltage level), the peak detect/comparator circuit 434 provides an adjust signal to the variable capacitors 430 and 432 that effectively adds or decreases the load across the interpolator system output to maintain Equation 1 substantially constant. Thus, the interpolator system 208a provides a constant peak-to-peak voltage, or substantially constant peak-to-peak voltage, which according to Equation 1, results in a constant T.

The capacitance values of the variable capacitors 430 and 432 can be set using the peak detect/comparator circuit 434. In the interpolator system 208a shown in FIG. 4, the low level peak value of the clk/clkn signal (at output terminals 209a and 209b) is set by the low impedance path to ground (through current sinks 414 and 418), the transistors 422 and 424 presenting high impedance paths. Thus, detection at the peak detect/comparator circuit 434 is focused on the high level peak value of the clk/clkn signal (e.g., relative to the positive rail). In some embodiments, the reverse may be true, where peak detection can be implemented on the low level voltage swing (e.g., relative to the negative rail). The peak detect/ comparator circuit 434 detects the high level clk/clkn signal and compares it to a predetermined voltage reference value. Responsive to this detection and comparison, the peak detect/ comparator circuit 434 provides an adjust signal on connection 436. The adjust signal is used to set the size (capacitance or impedance value) of the variable capacitors 430 and 432 to ensure a fixed peak-to-peak voltage at the output terminals 209a and 209b. This methodology keeps the value of V in Equation 1 constant or substantially constant as the interpolator system 208a interpolates. Since C from Equation 1 is changing, the relative relationship between C and I is held constant or substantially constant.

Hence, the relationship of Equation 1 is maintained, and the interpolator system 208a functions in a linear fashion. Specifically, the delay through the interpolator system 208a when (x) transistors 416 are activated and (N+1−x) transistors 420 are activated is [1/(N+1)×(time during which clk1 and clk2 overlap)] less than when (x−1) transistors 416 are activated and [N+1−(x+1)] transistors 420 are activated (assuming that clk1 rises before clk2). Hence, linearity is achieved. Furthermore, this relationship in Equation 1 is maintained across process, voltage, and frequency variations. This linearity implies that changing the number of transistors 416 and transistors 420 which are on (a digital operation) allows for a precise delay generation as a fraction of the clk1 and clk2 overlap time. This implicit digital-to-analog conversion allows digital control circuits to change clock timing in precisely controlled increments, enabling digital control circuits to reliably align and move clocks with minimal dependence on process parameters, voltage supply, and frequency of operation. Further explained, the size of the variable capacitor is set based on the characteristics for the circuit from component part to part such that given a constant Vref, the output swing will be the same or substantially the same regardless of the variation from part to part.

In view of the above description, it will be appreciated that one embodiment of an interpolator method 208b for the interpolator system 208a (FIG. 4) may comprise, as illustrated in FIG. 5, receiving a plurality of clock signals (502), shifting in phase at least one of the plurality clock signals to provide output clock signals having a defined voltage variation (504), detecting a peak voltage level of the defined voltage variation (506), comparing the peak voltage level with a reference voltage level (508), and responsive to the comparison, providing an adjust signal to a reactive element having an adjustable impedance, the adjust signal changing the impedance to set the defined voltage variation (510).

Any process descriptions or blocks in flow charts should be understood as representing modules, segments, or portions of code which may include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

One or more components of the interpolator system 208 (208a and 208b included) can be implemented in hardware, software, firmware, or a combination thereof. When implemented in hardware, the interpolator system 208 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

What is claimed:

1. A method of operating an interpolator system, comprising:

receiving a plurality of clock signals at an interpolator of the interpolator system, the interpolator comprising a first differential amplifier configured to receive a first clock signal and a second differential amplifier configured to receive a second clock signal, the first differential amplifier coupled to a first current sink having a first plurality of selectively activated transistors, the second differential amplifier coupled to a second current sink having a second plurality of selectively activated transistors, the interpolator excluding an oscillator;

responsive to receiving the plurality of clock signals, variably shifting in phase one or more of the plurality of clock signals until an output clock signal has a defined voltage variation, the variable shifting implemented by selectively activating one or more transistors of the first plurality of selectively activated transistors, one or more transistors of the second plurality of selectively activated transistors, or transistors from a combination of the first and second plurality of selectively activated transistors;

comparing a peak voltage level of the defined voltage variation with a reference voltage level; and responsive to the comparison, providing an adjust signal to impedance elements having an adjustable impedance, the impedance elements comprising a plurality of variable capacitors or variable resistors, the adjust signal changing the impedance to set the defined voltage variation.

2. The method of claim 1, wherein providing an adjust signal includes providing an adjust signal that causes an increased load across an output of the interpolator system.

3. The method of claim 1, wherein providing an adjust signal includes providing an adjust signal that causes a decreased load across an output of the interpolator system.

4. The method of claim 1, wherein providing the adjust signal includes changing the adjust signal to maintain a substantially constant slew rate.

5. An interpolator system, comprising:
an interpolator devoid of an oscillator and having first and second output terminals providing output signals, the interpolator further comprising a first differential amplifier configured to receive a first clock signal and a second differential amplifier configured to receive a second clock signal, the first differential amplifier coupled to a first current sink having a first plurality of selectively activated transistors, the second differential amplifier coupled to a second current sink having a second plurality of selectively activated transistors, the interpolator configured to provide the output signals based on selectively activating one or more of the selectively activated transistors of one or more of the first and second current sinks, the output signals comprising a first output followed by a second output, the first output having a first phase value selected between a first phase value corresponding to the first clock signal and a second phase value corresponding to the second clock signal, the second output comprising a third phase value different from the first phase value, the third phase value selected between a fourth phase value corresponding to the first clock signal and a fifth phase value corresponding to the second clock signal;
a comparator coupled to the first and second output terminals and configured to compare a peak voltage level with a reference voltage level; and
impedance elements coupled to the comparator and the first and second output terminals, the impedance elements comprising a plurality of variable capacitors or variable resistors, wherein the comparator is configured to provide a control signal to the impedance elements to change the impedance of the impedance elements to set a voltage variation of the output signals.

6. The system of claim 5, wherein the interpolator includes:
wherein the first and second differential amplifiers comprise first and second differential pair transistors;
first and second current sources coupled to the first and second differential pair transistors, respectively; and
wherein the first and second current sinks comprise first and second weighted current sinks coupled to the first and second differential pair transistors, respectively, the first and second output terminals coupled to the first and second differential pair transistors.

7. The system of claim 5, wherein the comparator is configured to provide the control signal in a manner that maintains a substantially constant slew rate.

8. The system of claim 5, wherein the comparator is configured to provide a varying voltage level signal.

9. An interpolator system, comprising:
means for variably shifting in phase at least one of a plurality clock signals to provide at least one output clock signal;
means for comparing a peak voltage level with a reference voltage level; and
means for setting a voltage swing of the at least one output clock signal, wherein the means for setting includes a plurality of variable capacitors or variable resistors.

10. The system of claim 9, wherein the means for shifting includes an interpolator.

11. The system of claim 9, wherein the means for detecting and comparing includes a comparator.

12. A data recovery system, comprising:
a first comparator and a second comparator configured to receive data signals;
detection logic coupled to the first comparator and the second comparator, the detection logic configured to detect edges corresponding to data transitions in the data signals; and
an interpolator system coupled to the first comparator and the second comparator and the detection logic, the interpolator system including:
an interpolator devoid of an oscillator and having first and second output terminals providing output signals to the first comparator and the second comparator;
a third comparator coupled to the first and second output terminals and configured to compare a peak voltage level of the output signals with a reference voltage level; and
impedance elements coupled to the third comparator and the first and second output terminals, the impedance elements comprising a plurality of variable capacitors or variable resistors, wherein the third comparator is configured to provide a control signal to the impedance elements to change the impedance of the impedance elements to set a voltage variation of the output signals.

13. The system of claim 12, wherein the first comparator and the second comparator are configured to receive the output signals from the interpolator system to optimally locate a sampling location for sampling the received data signals.

14. The system of claim 12, wherein the detection logic is configured to detect edges in a data stream provided from the first comparator and the second comparator corresponding to the received data signals and provide a plurality of phase-shifted clock signals to the interpolator system based on the detected edges.

* * * * *

UNITED STATES PATENT AND TRADEMARK OFFICE
CERTIFICATE OF CORRECTION

PATENT NO. : 7,498,858 B2
APPLICATION NO. : 10/978328
DATED : March 3, 2009
INVENTOR(S) : Jayen J. Desai et al.

It is certified that error appears in the above-identified patent and that said Letters Patent is hereby corrected as shown below:

In column 2, line 13, delete "said/or" and insert -- and/or --, therefor.

In column 2, line 17, delete "round" and insert -- around --, therefor.

In column 6, line 39, delete "430$s$" and insert -- 430 --, therefor.

In column 6, line 42, delete "wit" and insert -- with --, therefor.

In column 6, line 44, delete "$V_8$" and insert -- $V_s$ --, therefor.

In column 6, line 46, delete "$V_8$" and insert -- $V_s$ --, therefor.

Signed and Sealed this

Eighteenth Day of August, 2009

David J. Kappos
*Director of the United States Patent and Trademark Office*